United States Patent

[11] 3,609,109

| [72] | Inventors | Klaus Plesske<br>Wiesbaden-Biebrich;<br>Alfred Kuhlkamp, Hofheim; Dieter Zingel,<br>Wiesbaden-Biebrich, all of Germany |
|---|---|---|
| [21] | Appl. No. | 781,980 |
| [22] | Filed | Dec. 6, 1968 |
| [45] | Patented | Sept. 28, 1971 |
| [73] | Assignee | Chemische Werke Albert<br>Wiesbaden-Biebrich, Germany |
| [32] | Priority | Dec. 8, 1967 |
| [33] | | Germany |
| [31] | | P 17 20 424.9 |

[54] HARDENABLE POLYESTER POLYCONDENSATES
11 Claims, No Drawings

[52] U.S. Cl. .................................................... 260/22,
 117/132, 117/161, 260/32.6, 260/32.8, 260/33.2,
 260/33.6, 260/39, 260/40, 260/75, 260/850,
 260/860
[51] Int. Cl. .................................................... C08g 17/007,
 C08g 17/10, C09d 3/64
[50] Field of Search .................................................... 260/22, 22
 EP, 75, 75 EP, 860

[56] References Cited
UNITED STATES PATENTS

| 3,476,697 | 11/1969 | Clements .................. | 260/22 |
| 3,218,274 | 11/1965 | Boller et al. .................. | 260/22 |
| 3,380,942 | 4/1968 | Menke .................. | 260/22 |
| 3,427,267 | 2/1969 | Stieger et al. .................. | 260/22 |
| 3,442,868 | 5/1969 | Ogata et al. .................. | 260/75 |
| 3,449,467 | 6/1969 | Wynstra .................. | 260/850 |

*Primary Examiner*—M. J. Welsh
*Assistant Examiner*—Ronald W. Griffin
*Attorney*—Littlepage, Quaintance, Wray & Aisenberg ABSTRACT: A process for the manufacture of a hardenable polycondensate which comprises esterifying (a) a polymer of a low molecular weight containing carboxylic groups, (b) a saturated or olefinically unsaturated carboxylic acid or mixture thereof having up to 25 carbon atoms and (c) a polyhydric alcohol with up to 10 carbon atoms to yield a polyester with an acid number in the range from 30 to 120, and further reacting the resulting polyester at an elevated temperature with a mono-epoxide compound having up to 20 carbon atoms, a hardenable polycondensate consisting essentially of a polyester having an acid number in the range from 30 to 120 and derived from the components (a) to (c), a mixture thereof with a reactive resin and a hardened product thereof.

HARDENABLE POLYESTER POLYCONDENSATES

This invention is concerned with a process for the production of hardenable polycondensates and their use, for example, in the manufacture of lacquers.

Polycondensates may be produced from lower molecular weight copolymers containing carboxylic acid anhydride groups, by coesterification with long-chained fatty acids having up to 20 C-atoms and polyhydric alcohols, and may be used as air-drying or thermohardening lacquer-binding agents. Generally, copolymers of maleic anhydride with vinyl-aromatic hydracarbons are used as carboxylic acid anhydride-containing copolymers, and these are transformed to polyesters according to known processes at elevated temperature with accompanying dehydration.

An important disadvantage of these processes is, however, that during the polyester formation undesirable gel formations frequently occur, resulting in products which are virtually unusable. This is owing to a high acid functionality of the copolymers, e.g. by a high proportion of free carboxyl or carboxylic acid anhydride groups. Owing to the premature gelation, complete esterification is hence impossible. In order to prepare gel-free polycondensates, the esterification must be discontinued at high residual acid numbers, for example, over 40. Owing to their high acid number, polyesters obtained in this manner possess poor storage stability and they can, for hardening, be combined at an elevated temperature only with hardenable synthetic resins having relatively low reactivity, e.g. melamine resins, such as hexamethoxymethylmelamine or epoxide resins, e.g. derived from epichlorhydrin and diphenylolalkanes, (particularly diphenylolpropane) if desired in aqueous solution. High stoving temperatures are thus required for complete hardening. In air drying lacquer binding agents high acid numbers are quite undesirable for reasons of incompatibility with certain pigments, for example zinc white. The high acid content causes the formation of zinc soaps from the zinc oxide, whereby an increasing thickening of the resin takes place. The above-described polycondensates with a high residual acid number are therefore unsuitable for the production of air-drying lacquers.

Complete esterification down to residual acid numbers of around five to 15, such as are desired for example in thermohardenable and air-drying alkyd resins, can be obtained without premature gelation according to known processes only if the proportion of acid or anhydride groups is kept low in the acid-anhydride-containing copolymers used. There can only be used, for example, copolymers of vinyl-aromatic hydrocarbons with maleic anhydride, the maleic anhydride content of which does not exceed 20 percent by weight. For the preparation of low molecular-weight copolymers with low maleic anhydride contents very complicated processes are again necessary since maleic anhydride copolymerizes with vinyl-aromatic hydrocarbons preferably in the ratio of 1:1, that is to polymers, preferably telomers, with a high acid functionality.

It is therefore desirable to prepare, by using low molecular-weight copolymers, gel-free copolyesters with low acid numbers of e.g., five to 15, which are used as air-drying or thermohardenable lacquer raw materials.

According to the invention, therefore, we provide a process for the manufacture of a hardenable polycondensate, wherein (a) a polymer, particularly a telomer, of a low molecular weight containing carboxylic acid or anhydride groups or both, (b) a saturated or olefinically unsaturated carboxylic acid or mixture thereof having up to 25 C-atoms and (c) a polyhydric alcohol with up to 10 C-atoms are esterified to yield a polyester with an acid number in the range from 30 to 120, preferable 30 to 80, and the resulting polyester is further reacted at an elevated temperature with a monoepoxide compound having up to 20 C-atoms. In this way the acid number of the polyester is reduced.

The resulting polycondensate may then be hardened in a further step. Depending on the nature of the polycondensate it may or may not be necessary to add a reactive resin to effect hardening e.g., to a lacquer film.

By means of the process according to the invention, the value of carboxylic acid anhydride-containing copolymers as starting materials for carboxylic-acid-modified polycondensates is thus considerably widened. Compared with known processes in particular copolymers having a carboxylic acid anhydride content of over 20 percent by weight can be used, without substantial danger of premature gelation occurring. In the case of a copolymer from maleic anhydride and styrene, the proportion of the acid anhydride can be increased even to approximately 65 percent by weight.

The polymers (a) used as starting materials may have an average molecular weight between 400 and 5,000. If the polymers (a) are carboxylic and/or carboxylic acid anhydride-containing telomers they preferably have a mean molecular weight between 400 and 2,500 and on the average comprise between 0.8 and 1.8 carboxyl groups or a corresponding number of carboxylic acid anhydride groups, based on 100 molecular weight units. The number of 1.8 carboxyl groups should, however, not be exceeded. The aforesaid telomers can be prepared by telomerisation of olefinic hydrocarbons, such as olefins, preferably mono-olefins having two to nine C-atoms, such as ethylene, propylene, butylene and octene, or substituted olefinis; vinyl monomers, such as styrene, vinyl pyridine and vinyl pyrrolidone; vinylidene monomers, such as α-methyl styrene; acrylic or methacrylic acid derivatives, e.g. their esters, amides and nitriles; with monomers containing carboxyl or carboxylic acid anhydride groups, such as acrylic acid, methacrylic acid, maleic anhydride, maleic acid or maleic acid half esters with monohydric alcohols, in each case separately or in admixture. Telomers which predominantly consist of units containing carboxy or carboxylic acid anhydride groups may also be used as starting materials. In this case copolymers with a carboxylic acid anhydride content of 20 to 50 percent by weight may be used. Preferably those olefin-telomers, particularly styrene-maleic acid anhydride telomers are used, having a mol ratio of maleic anhydride: styrene of 1:0.5 to 1:20, preferably 1:1 to 1:8. Examples of suitable telomers include: (1) those from styrene and maleic anhydride (mol ratio 1:1, 2:1, 3:1, 5:1, 8:1 ), (2) those from octene and maleic anhydride (mol ratio 1:1), (3) those from styrene, α-methyl styrene and maleic anhydride (mol ratio 1:1:2), those cited under (1) and (2) preferably being used.

Telomers normally contain in the molecule built-in telogens which acted as chain transmitters in the preparation of the telomers but which do not influence the preparation of the polycondensates. There telogens are, for example, cumene, xylene, chloroform or diisobutylketone. They can be contained in the telomers in a proportion of 0.1 to 25, preferably 5 to 20 percent, by weight.

As reaction component (b) in the esterification, carboxylic acids with two to 25 C-atoms and/or their anhydrides, preferably acids, derived from fats in particular those with four to 18 C-atoms are advantageously used. Suitable acids and anhydrides are, for example, isononanoic acid, coconut fatty acids (first fraction), soya oil fatty acids, linseed oil fatty acids, palmitic acid, benzoic acid, o-,m-,p-toluene-sulphonic acid, phenyl-acetic acid; as well as adipic acid, phthalic anhydride, maleic anhydride, phthalic acid, maleic acid, isophthalic acid, terephthalic acid, tri- or pyromellitic acid, sebacic acid or mixtures thereof.

If the acids are saturated; polycarboxylic acids, for example, those with up to 15 C-atoms can be used in the esterification. Polycarboxylic acids which are di-, tri- or tetracarboxylic are preferred. According to one embodiment of the invention monocarboxylic acids together with polycarboxylic acids having up to 15 C-atoms and which do not contain any acetylenic or polymerisable olefinic double bonds, and/or their anhydrides, can be used for the esterification in the first step.

Important practical properties, such as flexibility, drying properties, fade resistance, pigment wetting, hardness, etc., of the hardened end products can be influenced in known manner by the type and quantity of these carboxylic, particularly fatty acids.

If unsaturated acids, e.g. fatty acids, are used in quantities of 40 percent, generally up to 80 percent, by weight in the total condensate as monocarboxylic acid components in the polyester a polycondensate is formed which may be used in an air-drying system, in which the addition of hardenable resins can be omitted if desired. Hardening can thus be effected at room temperature if desired.

The addition of polycarboxylic acids or anhydrides thereof has the advantage that the danger of gelation may be decreased Polyhydric alcohols which are necessary as further components for the preparation of the polycondensates include, for example, dihydric alcohols, such as ethylene glycol, propylene glycol, butane-1,4-diol, neopentyl glycol and diethylene glycol or higher alcohols, such as trimethylolpropane, trimethylolethane, glycerol and pentaerythritol. Mixtures of di- and higher alcohols, such as ethylene glycol and trimethylolpropane or diethylene glycol and pentaerythritol, can also be used. The use of alcohols with more than two functional groups permits the preparation of polycondensates of higher viscosity. Generally, however, polyhydric alcohols having 2, 3 or 4 hydroxy groups will be used.

The ratios of the various starting materials for the mixed esterification are normally so calculated that there is an excess of 10 to 30 equivalent percent of OH-groups over the carboxylic acid or anhydride groups. Preferably the following mol ratios of the individual components are chosen:

| telomer | 1 to 2.4 gram equivalent (calculated on equivalent carboxylic acid) |
|---|---|
| polycarboxylic mol acid or -anhydride | 0 to 1.4 mol |
| monocarboxylic acid | 1.2 to 3 mol |
| polyhydric alcohol | 2 to 3 mol |

The preparation of the polycondensates from the above-stated starting materials is effected in the first step in a convenient manner at an elevated temperature, generally between 150° and 250° C. The water liberated in the esterification reaction can be distilled off directly (melting process) carried away with the aid of a current of inert gas or azeotropically distilled by means of a solvent, such as benzene, xylene or toluene. To shorten the reaction time, small quantities of esterification catalysts, such as p-toluene-sulphonic acid, phosphoric acid, hydrochloric acid or sulfuric acid can be added. The esterification time is generally several hours, during which no gel formation occurs even if telomers are used which contain up to 50 percent by weight of a monomer containing carboxylic acid anhydride. The products thus obtained have generally an acid number of 30 to 120, preferably 30 to 80.

Monoepoxide compounds having up to 12 carbon atoms and being suitable for the reaction in the second step are, for example, alkylene oxides with up to four C-atoms, such as ethylene oxide, propylene oxide and butylene oxide; epichlorhydrin; aliphatic monoglycidyl ethers, e.g. ethylglycidyl ether and allylglycidyl ether; aliphatic monoglycidyl esters, such as gylcidyl esters of branched carboxylic acids with eight to 12 C-atoms; monoepoxydicyclopentadiene, epoxidized olefins preferably having eight to 12 C-atoms, styrene oxide or mixtures thereof. Propylene oxide or aliphatic monoglycidyl esters are preferably used. Monoepoxides in the mol ratio of 0.2 to 3, preferably 0.8 to 1.5 per mol of free carboxyl and/or carboxylic acid anhydride groups are generally used. The desired final acid number can be readily controlled by the quantity of the monoepoxide compound. This reaction can be performed in the melt or in the presence of inert solvents at an elevated temperature, e.g. at 80° to 150° C., if desired using a catalyst. The residual carboxyl and carboxylic acid anhydride groups are thus wholly or partially esterified. The final acid number is normally adjusted to two to 25, preferably five to 15. Suitable solvents for this reaction are e.g. aromatic and aliphatic hydrocarbons, alcohols, esters or ketones. The polycondensate obtained in the first step is normally first dissolved in a solvent, for example to form a 60 percent solution, and the monoepoxide compound gradually added to this solution of 80 to 200° C., preferably at 80° to 140° C.

Suitable catalysts therefore are tertiary amines or quaternary ammonium compounds or both, e.g. aliphatic or aromatic amines, such as triethyl amine, n-dodecyl trimethylammonium chloride, dimethyl aniline, alkylamine-substituted phenols, such as 2,4,6-tris-(dimethylamino)-phenol, boron-fluoride-amine-adducts, such as piperidine-boron-trifluoride-adduct, substituted acid amides, such as dimethylformanide or the like, either alone or in the mixture. If desired they are used in an amount of 0.008 to 0.05 mol per mol of free carboxylic or carboxylic anhydride groups or of both.

Under the given conditions the reaction of the second step takes place unexpectedly rapidly with esterification of the still free carboxyl and carboxylic acid anhydride groups; the progress of the reaction can be followed with reference to the acid number. Surprisingly also the residual carboxylic acid anhydride groups which can be esterified only with difficulty according to the known processes, can be esterified practically quantitatively by this method, as could be proved, for example, by IR-spectroscopy. When storing the end products there is thus no danger of undesirable further reaction of these anhydride groups taking place, for example by cross linking.

The final acid number is normally reduced after the reaction according to the invention with monoepoxides to two to 25, preferably five to 15. Owing to this low acid number it is possible that the hardening can also be carried out with hardenable synthetic resins of higher reactivity, i.e. at lower temperatures than hitherto. On the basis of this low acid number, the products are readily compatible also with other synthetic resins and pigments so that sensitive pigments are not attacked chemically. Moreover by a suitable choice of the acid number the reaction product can be adjusted to achieve optimum wetting of the pigments. This is a very important factor in the manufacture of coating compositions.

Products which have been prepared from drying fatty acids can be hardened, if desired, without the addition of any further reactants. Other polycondensates are generally hardened by admixture with reactive synthetic resins, especially hardenable resins and then effecting hardening at an elevated temperature, e.g. above 100° to 250° C., preferably 120° to 180° C. In both cases products with good properties with respect to lacquers and coatings are formed. Amine resins, and in particular highly reactive amine resins, preferably melamine- and urea-formaldehyde resins but also ammeline, guanidine, dicyanodiamide, benzoguanamine and other amine-formaldehyde resins or their hardenable etherification products with monohydric alcohols, such as hexamethoxymethyl-melamine, and epoxide resins may be used as hardenable synthetic resins or preferably epoxide resins are used in combination with amine resins. The quantity of the hardenable resin added is generally 5 to 50 percent by weight, calculated on solids of the polycondensate.

The properties of the end products prepared according to the invention can be modified by admixtures with other resins, e.g. of phenolic resins, preferably resols, alkyd resins, or acrylic resins. If desired, hardening catalysts, such as phthalic acid, maleic acid half ester, p-toluene-sulfonic acid, phosphoric acid or its acid esters, e.g. phosphoric acid monobutyl ester of the like, fillers e.g. heavy spar, zinc oxide and/or pigments, such as titanium dioxide, zinc sulfide phthalocyanine-blue or red can also be admixed without an undesirable increase in viscosity occurring. The hardened end products obtained according to the invention have good elasticity, high hardness, good compatibility with pigments and good chemical stability to fats, organic solvents, water and salt solutions alkalis, acids and a good weather stability. Moreover, they possess a good adhesion to substrates.

The products prepared according to the invention can in the first place be hardened into coatings on wood, metal, paper and textiles, and can be used as binding agents for lacquers, as adhesives, casting resins, as a basis for materials for being moulded in a press and other moulding materials and as molded articles.

In order that the invention may be well understood the following examples are given by way of illustration.

EXAMPLE 1

The following components are mixed in a three-neck flask equipped with a stirrer, $CO_2$-gas inlet tube and water separator with reflux condenser: 240 g. of a styrene-maleic anhydride telomer (mol ratio 1:1, molecular weight 800, cumene content 15 percent by weight), 78 g. of maleic anhydride, 89 g. of phthalic anhydride, 346 g. of the esterification product of coconut fatty acid (first fraction) with trimethylolpropane (mol ratio 1:1, acid number 3), 187 g. of neopentyl glycol and 5 g. of p-toluene-sulphonic acid. The mixture is slowly melted with stirring and then heated for 3 hours at 200° C., whereby 35 ml. of water distilled off. The acid number thus drops to 45.

The resulting highly viscous resin is dissolved in 500 g. of xylene, 2 g. of triethylamine are added, and 30 g. of propylene oxide are added at 120° to 130° C. over a period of 30 minutes. The reaction mixture is then kept at this temperature for 4 hours as a result of which the acid number drops to 10 (calculated on solid resin). The resulting resin has a viscosity of 300 cp. in a 50 percent xylene solution at 20° C.

This product is mixed in a weight ratio of resin: melamine resin = 75:25 with a melamine formaldehyde resin (from 1 mol of melamine and about 6 mol of formaldehyde condensed thereto), etherified with butanol, and pigmented in conventional manner with titanium dioxide in the weight ratio 1:1. After application to a steel sheet, the mixture is stoved for 30 minutes at 120° C. A pure white, high-gloss film of great hardness and good flexibility and adhesion is formed.

EXAMPLE 2

The following components are mixed in the apparatus as described in example 1: 246 g. of styrene-maleic anhydride telomer (mol ratio 1:1, molecular weight 800, cumene content 15 percent by weight), 78 g. of maleic anhydride, 89 g. of phthalic anhydride, 190 g. of isononanoic acid (3,3,5-trimethylhexane-carboxylic acid), 144 g. of trimethylolpropane and 112 g. of ethylene glycol.

After melting, polycondensation is carried out for 2 hours at 200° C., whereby 60 ml. of water distil off. The acid number is then approximately 65. After addition of 500 g. of xylene and 2 g. of triethylamine, 50 g. of propylene oxide is added dropwise at 120° to 130° and the reaction mixture is kept at this temperature for 4 to 5 further hours. The final acid number is 12 (calculated on solid resin). The viscosity is a 50 percent xylene solution at 20° C. is 3,000 cp.

The manufacture of a white stoving lacquer is effected as described in example 1. After stoving, in this example there is likewise obtained a very hard and solid film with valuable properties with respect to lacquers and coatings.

EXAMPLE 3

The following components are mixed in the apparatus described in example 1: 490 g. of styrene-maleic anhydride telomer (mol ratio 8:1, molecular weight 2,000 xylene content 5 percent by weight), 102 g. of adipic acid, 173 g. of the esterification product from isononanoic acid and trimethylolpropane (mol ratio of 1:1, acid number = 2), and 81 g. of butane-1,4-diol.

The reaction mixture is then esterified for 5 hours at 180° to 200° C., whereby—23 ml. of water being removed—the acid number drops to about 35. After addition of 400 g. of xylene and 2 g. of triethylamine, 30 g. of propylene oxide are added at 120° to 130° C. over a period of 30 minutes and the reaction mixture is kept at this temperature for 3 further hours. A resin of the viscosity of 300 cp. (in 50 percent xylene, 20° C.) and acid number 10 (calculated on solid resin) is formed.

After mixing with a melamine formaldehyde resin as in example 1 in the weight ratio resin : melamine resin = 75:25, pigmenting with $TiO_2$ in the weight ratio 1:1 and stoving for 30 minutes at 120° C., an extremely flexible and hard lacquer film having good resistance to substances containing dyestuffs and fats, such as lipstick or shoe polish, if formed.

EXAMPLE 4

70 g. of the glycidyl ester of a mixture of aliphatic branch-chained carboxylic acids with nine to 12 C-atoms are added to 520 g. of the unreacted polycondensate described in example 2 (dissolved in the same quantity by weight of xylene, and having an acid number of 65 calculated on solid resin), and heated for 8 hours at 140° C. The acid number thus drops to 15 (calculated on solid resin). The viscosity of the resulting resin is 200 cp. (in a 50 percent xylene solution, 20° C.).

A white stoving lacquer is then manufactured as described in example 1. A high-gloss lacquer film is formed, the elasticity of which is considerably higher than that of example 2.

EXAMPLE 5

The following components are mixed in the apparatus described in example 1 and heated for 2 hours at 200° C.: 220 g. of octene-maleic anhydride telomer (mol ratio 1:1, molecular weight 1,000, cumene content 12 percent by weight), 78 g. of maleic anhydride, 89 g. of phthalic anhydride, 346 g. of the esterification product of isononanoic acid with trimethylolpropane (mol ratio of 1:1, acid number = 2), 190 g. of diethylene glycol and 5 g. of p-toluene-sulfonic acid.

40 ml. of water are thus distilled off whilst the acid number (calculated on solid resin) drops to 50. After diluting with 500 g. of xylene and adding 2 g. of triethylamine, 50 g. of propylene oxide are added at 125° C. over a period of 30 minutes and the reaction mixture is kept at this temperature for 5 hours. The resulting resin has an acid number of 11 and a viscosity of 500 cp. (50 percent solution in xylene, 20° C.).

A white stoving lacquer is manufactured from this product, as described in example 1. The resulting lacquer film has outstanding properties, especially hardness, elasticity and chemical stability.

EXAMPLE 6

The following starting materials are mixed in the apparatus described in example 1 and heated for 2 hours at 180° to 200° C.: 320 g. of styrene-maleic anhydride telomer (mol ratio 2:1, molecular weight 1,450, xylene content 6 percent by weight), 78 g. of maleic anhydride, 89 g. of phthalic anhydride, 346 g. of the esterification product from isononanoic acid with trimethylolpropane (mol ratio 1:1, acid number = 2), 190 g. of diethylene glycol and 5 g. of p-toluene-sulfonic acid. The acid number thus drops to 51 to 32 ml. of water distil off.

500 g. of xylene and 2 g. of triethylamine are then added and 60 g. of propylene oxide are added dropwise at 130° C. over a period of 30 minutes. After reaction for 2 hours at 120° to 130° C., the acid number has dropped to 15. The resulting yellowish resin has a viscosity of 800 cp. (in a 50 percent xylene solution, 20° C.). This product is mixed with a melamine resin as described in example 1 in the respective weight ratio 75:25 pigmented with $TiO_2$ (1:1 by weight) and applied on a steel sheet by spray-coating. The lacquer is then stoved for 30 minutes at 150° C., whereby a high-gloss, hard and stable lacquer film with good adhesion is formed.

EXAMPLE 7

The following components are mixed in the apparatus described in example 1 and heated for 2 hours at 200° C.: 625 g. of styrene-maleic anhydride telomer (mol ratio 5:1, molecular weight 1,900, cumene content 6 percent by weight), 78 g. of maleic anhydride, 89 g. of phthalic anhydride, 870 g. of distilled soya fatty acid and 402 g. of trimethylolpropane. A reactive highly fluid resin (100 cp. in a 50 percent xylene solution, 20° C.) with acid number 10 is thus formed.

After addition of 1,000 g. of xylene and 4 g. of triethylamine, reaction is effected with 70 g. of propylene oxide at 130° C. as described in example 1. The product forming after 4 hours has acid number 5 and a viscosity of 200 cp. (in a 50 percent xylene solution, 20° C).

To produce an air-drying white surface lacquer, the product is pigmented with $TiO_2$, 100 g. of $TiO_2$ being milled with 100 g. of resin, and siccatives, for example 0.03 percent of cobalt naphthenate (calculated on resin) are added. The lacquer when applied to steel dries within a few hours to form a hard, tough elastic coating.

The expression "carboxylic group" is used to cover carboxylic acid groups or anhydride groups of both.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A process for the manufacture of a hardenable polycondensate which comprises esterifying a mixture of
   A. from 1 to 2.4 gram-equivalents, based on a total equivalents of carboxylic acids thereof, of a copolymer telomer of a compound I selected from the group consisting of
      a. olefin having from two to nine carbon atoms,
      b. cyclic vinyl compound with six to nine carbon atoms,
      c. acrylic acid ester, amide or nitrile, and
      d. methacrylic acid ester, amide or nitrile;
   and an olefinic monomeric compound
   II selected from the group consisting of acrylic acid, methacrylic acid, maleic acid, maleic anhydride and a half ester of maleic acid with monohydric alcohol;
   the telomer having a molecular weight in the range from 400 to 5,000;
   B. at least one component having from two to 25 carbon atoms and selected from the group consisting of
      B1. 1.2 to 3 mols of a saturated or olefinically unsaturated monocarboxylic acid and
      B2. up to 1.4 mols of a saturated or olefinically unsaturated polycarboxylic acid and
   C. 2 to 3 mols of a polyhydric alcohol with up to 10 carbon atoms; to yield a polyester with an acid number in the range from 30 to 120, and further reacting the resulting polyester at a temperature in the range from 80° to 200° C. with
   D. a monoepoxide compound having from two to 12 carbon atoms.

2. A process according to claim 1 wherein said resulting polyester contains a surplus of 10 to 30 equivalent percent of OH-groups, calculated on the carboxylic groups.

3. A process according to claim 1 wherein the monoepoxide comprises 0.2 to 3 mols of an alkylene oxide with up to 4 carbon atoms per mol of total carboxylic groups, whereby a product having an acid number of from two to 25 is obtained.

4. A hardenable polycondensate having an acid number within the range from 30 to 120 and which consists essentially of a polyester of
   A. from 1 to 2.4 gram-equivalents, based on a total equivalents of carboxylic acids thereof, of a copolymer telomer of a compound I selected from the group consisting of
      a. olefin having from two to nine carbon atoms,
      b. cyclic vinyl compound with six to nine carbon atoms,
      c. acrylic acid ester, amide or nitrile, and
      d. methacrylic acid ester, amide or nitrile;
   and an olefinic monomeric compound
   II selected from the group consisting of acrylic acid, methacrylic acid, maleic acid, maleic anhydride and a half ester of maleic acid with monohydric alcohol;
   the telomer having a molecular weight in the range from 400 to 5,000;
   B. at least one component having from two to 25 carbon atoms and selected from the group consisting of
      B1. 1.2 to 3 mols of a saturated or olefinically unsaturated monocarboxylic acid and
      B2. up to 1.4 mols of a saturated or olefinically unsaturated polycarboxylic acid; and
   C. 2 to 3 mols of a polyhydric alcohol with up to 10 carbon atoms; the acid functions of said polycondensate being in part esterified by groups of a dihydric alcohol in which the alcoholic groups are in a vicinal function.

5. A polycondensate according to claim 4, wherein said telomer has 0.8 to 1.8 carboxylic groups, based on 100 units of molecular weight.

6. A polycondensate according to claim 4, wherein component has a carboxylic anhydride content of 20 to 50 percent by weight.

7. A polycondensate according to claim 4, wherein the polycondensate contains at least 40 percent by weight of an olefinically unsaturated fatty acid.

8. A hardenable composition comprising a hardenable resin in admixture with a polycondensate according to claim 4.

9. A hardened product comprising the hardened composition of claim 8.

10. A hardenable polycondensate having an acid number within the range from 30 to 120 and which consists essentially of a polyester of
    A. from 1 to 2.4 gram-equivalents, based on total equivalents of carboxylic acids thereof, of a copolymer telomer of
       I at least one olefinically unsaturated hydrocarbon monomer with from two to nine carbon atoms and
       II at least one at most dibasic $\alpha,\beta$-olefinically unsaturated carboxylic acid with a telogen selected from the group consisting of cumene, xylene chloroform and diisobutyl ketone, the telomer having a molecular weight in the range from 400 to 5,000;
    B. at least one component having from two to 25 carbon atoms and selected from the group consisting of
       B1. 1.2 to 3 mols of a saturated or olefinically unsaturated monocarboxylic acid and
       B2. up to 1.4 mols of a saturated or olefinically unsaturated polycarboxylic acid; and
    C. 2 to 3 mols of a polyhydric alcohol with up to 10 carbon atoms; the acid functions of said polycondensate being in part esterified by groups of a dihydric alcohol in which the alcoholic groups are in a vicinal function.

11. A hardenable polycondensate having an acid number within the range from 30 to 120 and which consists essentially of a polyester of
    A. from 1 to 2.4 gram-equivalents, based on total equivalents of carboxylic acids thereof, of a copolymer of
       I at least one olefinically unsaturated hydrocarbon monomer with from two to nine carbon atoms with
       II at least one at most dibasic $\alpha,\beta$-olefinically unsaturated carboxylic acid;
    B. at least one component having from two to 25 carbon atoms and selected from the group consisting of
       B1. 1.2 to 3 mols of a saturated or olefinically unsaturated monocarboxylic acid and
       B2. up to 1.4 mols of a saturated or olefinically unsaturated polycarboxylic acid; and
    C. 2 to 3 mols of a polyhydric alcohol with up to 10 carbon atoms; the acid functions of said polycondensate being in part esterified by groups of a dihydric alcohol in which the alcoholic groups are in a vicinal function.

UNITED STATES PATENT OFFICE
CERTIFICATE OF CORRECTION

Patent No. 3,609,109          Dated September 28, 1971

Inventor(s) KLAUS PLESSKE

It is certified that error appears in the above-identified patent and that said Letters Patent are hereby corrected as shown below:

Column 1, line 11, "hydracarbons" should read --hydrocarbons--; line 68, "preferable" should read --preferably--; line 75, "hardening e.g.," should read --hardening, e.g.,--. Column 2, line 32, "carboxy" should read --carboxyl--; line 47, "There" should read --These--; line 53, "acids, derived from fats" should read --acids derived from fats,--; line 63, "saturated; polycarboxylic" should read --saturated polycarboxylic--. Column 3, line 10, "decreased" should read --decreased.--; line 33, "polycarboxylic mol" should read --polycarboxylic--. Column 4, line 5, "of" should read --at--; line 26, "reaction" should read --reactions--; line 27, "cross linking" should read --cross-linking--; line 64, "of" should read --or--. Column 6, line 53, "51 to 32 ml." should read --51 and 32 ml.--. Column 8, claim 6, line 19, "ponent has" should read --ponent A) has--; claim 7, line 23, "acid." should read --acid B).--.

Signed and sealed this 28th day of November 1972.

(SEAL)
Attest:

EDWARD M. FLETCHER, JR.
Attesting Officer

ROBERT GOTTSCHALK
Commissioner of Patents